US012722691B2

(12) United States Patent
Dye et al.

(10) Patent No.: US 12,722,691 B2
(45) Date of Patent: Sep. 1, 2026

(54) MOBILE ELEVATED WORK PLATFORM VEHICLES WITH NOVEL STEERING SYSTEM AND RELATED METHODS

(71) Applicant: CALIFORNIA MANUFACTURING AND ENGINEERING CO., LLC, Kerman, CA (US)

(72) Inventors: Matthew Dye, Kerman, CA (US); Gary Crook, Kerman, CA (US)

( * ) Notice: Subject to any disclaimer, the term of this patent is extended or adjusted under 35 U.S.C. 154(b) by 316 days.

(21) Appl. No.: 18/101,584

(22) Filed: Jan. 26, 2023

(65) Prior Publication Data

US 2023/0234636 A1 Jul. 27, 2023

Related U.S. Application Data

(60) Provisional application No. 63/303,042, filed on Jan. 26, 2022.

(51) Int. Cl.
*B62D 5/04* (2006.01)
*B62D 7/09* (2006.01)
(Continued)

(52) U.S. Cl.
CPC ........... *B62D 5/046* (2013.01); *B62D 5/0418* (2013.01); *B62D 15/021* (2013.01); *B62D 17/00* (2013.01);
(Continued)

(58) Field of Classification Search
None
See application file for complete search history.

(56) References Cited

U.S. PATENT DOCUMENTS 366,365 A 7/1887 Averberg
543,196 A 7/1895 Stevens, Jr.
(Continued)

FOREIGN PATENT DOCUMENTS

AT 406359 B 4/2000
CN 104591051 A1 5/2015
(Continued)

OTHER PUBLICATIONS

English Abstract of CN104591051 retrieved from Espacenet at https://worldwide.espacenet.com/patent/search/family/053117180/publication/CN104591051A?q=pn%3DCN104591051A.
(Continued)

*Primary Examiner* — Kevin R Steckbauer
(74) *Attorney, Agent, or Firm* — Sierra IP Law, PC; William K. Nelson

(57) ABSTRACT

A vehicle steering system for a compact mobile elevating work platform ("MEWP") or other vehicle and a method for dynamically determining independent wheel steering angles such that a predetermined steering geometry between steerable wheels of the vehicle are described. The steering system determines coordination of the independent wheels based on angle differences of the steerable wheels. The independent master and follower wheels of the present system are not mechanically linked, and the absence of mechanical linkages between the independent steerable wheels allows for efficiency of spatial efficiency and steering geometry accuracy. The independent operation facilitates accommodation of the steering actuators into confined lateral compartments, which itself enables the machine lifting mechanism to occupy a space hitherto used for a mechanical steering connection between the wheel assemblies.

20 Claims, 9 Drawing Sheets

(51) Int. Cl.

| | |
|---|---|
| ***B62D 15/02*** | (2006.01) |
| ***B62D 17/00*** | (2006.01) |
| ***B62D 21/02*** | (2006.01) |
| ***B66F 9/075*** | (2006.01) |
| ***B66F 11/04*** | (2006.01) |

(52) U.S. Cl.
CPC .......... *B62D 21/02* (2013.01); *B66F 9/07568* (2013.01); *B66F 11/042* (2013.01); *B62D 7/09* (2013.01)

(56) References Cited

U.S. PATENT DOCUMENTS

| | | | |
|---|---|---|---|
| 1,439,388 | A | 12/1922 | Willett |
| 1,579,115 | A | 3/1926 | Bailey |
| 1,887,283 | A | 11/1932 | Brabson |
| 2,257,211 | A | 9/1941 | Willoughby |
| 2,581,488 | A | 1/1952 | Keltner et al. |
| 2,625,443 | A | 1/1953 | Sensenbaugh |
| 2,850,080 | A | 9/1958 | Clifford |
| 3,017,968 | A | 1/1962 | Horice |
| 3,030,166 | A | 4/1962 | Alva et al. |
| 3,112,010 | A | 11/1963 | Mihalik |
| 3,181,711 | A | 5/1965 | Stockton |
| 3,190,391 | A | 6/1965 | Hoard |
| 3,265,156 | A | 8/1966 | Jacobs |
| 3,395,648 | A | 8/1968 | Ford |
| 3,509,965 | A | 5/1970 | Mitchell |
| 3,596,735 | A | 8/1971 | Denier et al. |
| 3,638,757 | A | 2/1972 | Sampson |
| 3,664,458 | A | 5/1972 | Sterns et al. |
| 3,709,322 | A | 1/1973 | Mitchell |
| 3,834,488 | A | 9/1974 | Grove |
| 3,893,540 | A | 7/1975 | Beucher |
| 3,899,037 | A | 8/1975 | Yuker |
| 4,009,903 | A | 3/1977 | Manspeaker |
| 4,019,604 | A | 4/1977 | Benson |
| 4,064,999 | A | 12/1977 | Young |
| 4,157,129 | A | 6/1979 | Christopher |
| 4,175,644 | A | 11/1979 | Dick |
| 4,271,926 | A | 6/1981 | Cullity |
| 4,356,887 | A | 11/1982 | Fisher et al. |
| 4,395,191 | A | 7/1983 | Kaiser |
| 4,456,093 | A | 6/1984 | Finley et al. |
| 4,482,287 | A | 11/1984 | Menzi |
| 4,484,663 | A | 11/1984 | Wyse |
| 4,494,465 | A | 1/1985 | Fick, Jr. |
| 4,511,015 | A | 4/1985 | Purdy |
| 4,558,758 | A | 12/1985 | Littman |
| 4,558,847 | A | 12/1985 | Coates |
| 4,598,797 | A | 7/1986 | Schultz |
| 4,599,030 | A | 7/1986 | Skaalen et al. |
| 4,690,247 | A | 9/1987 | Yoshida |
| 4,708,221 | A | 11/1987 | Kubiak |
| 4,757,875 | A | 7/1988 | Hade |
| 4,775,029 | A | 10/1988 | MacDonald et al. |
| 4,779,691 | A | 10/1988 | Werdner |
| 4,826,030 | A | 5/1989 | Valley |
| 4,883,145 | A | 11/1989 | Deltatto |
| 5,062,500 | A | 11/1991 | Miller |
| 5,082,085 | A | 1/1992 | Ream et al. |
| 5,085,290 | A | 2/1992 | Guirlinger |
| 5,086,874 | A | 2/1992 | Treants |
| 5,094,515 | A | 3/1992 | Low |
| 5,137,101 | A | 8/1992 | Schneff |
| 5,143,177 | A | 9/1992 | Smith |
| 5,143,400 | A | 9/1992 | Miller |
| 5,148,885 | A | 9/1992 | Weyer |
| 5,158,023 | A | 10/1992 | Allen |
| 5,159,989 | A | 11/1992 | Claxton |
| 5,242,032 | A | 9/1993 | Prestwood |
| 5,269,393 | A | 12/1993 | Luscombe |
| 5,297,844 | A | 3/1994 | Haustein |
| 5,330,245 | A | 7/1994 | Boisset |
| 5,355,970 | A | 10/1994 | Hade |
| 5,358,067 | A | 10/1994 | Ford et al. |
| 5,380,262 | A | 1/1995 | Austin |
| 5,381,872 | A | 1/1995 | Peruzzi et al. |
| 5,409,083 | A | 4/1995 | Thompson |
| 5,427,197 | A | 6/1995 | Waters |
| 5,460,246 | A | 10/1995 | Burch |
| 5,476,050 | A | 12/1995 | Zimmer et al. |
| 5,513,900 | A | 5/1996 | Iglesias |
| 5,547,038 | A | 8/1996 | Madwed |
| 5,547,205 | A | 8/1996 | Sousa de Cabedo |
| 5,570,754 | A | 11/1996 | Stimson |
| 5,662,368 | A | 9/1997 | Ito et al. |
| 5,685,173 | A | 11/1997 | DeL'isle et al. |
| 5,695,173 | A | 12/1997 | Ochoa et al. |
| 5,743,149 | A | 4/1998 | Cullity |
| 5,775,869 | A | 7/1998 | Bishop |
| 5,868,218 | A | 2/1999 | Lawson |
| 5,899,036 | A | 5/1999 | Seiber |
| 5,913,379 | A | 6/1999 | Young et al. |
| 5,967,255 | A | 10/1999 | Young |
| 6,044,927 | A | 4/2000 | Newlin |
| 6,044,961 | A | 4/2000 | Hine |
| 6,050,660 | A | 4/2000 | Gurley |
| 6,105,721 | A | 8/2000 | Haynes |
| 6,119,882 | A | 9/2000 | Crook et al. |
| 6,176,341 | B1 | 1/2001 | Ansari et al. |
| 6,272,413 | B1 | 8/2001 | Takahashi |
| 6,283,483 | B1 | 9/2001 | Johnson et al. |
| 6,293,579 | B1 | 9/2001 | Schaeff |
| 6,301,534 | B1 | 10/2001 | McDermott et al. |
| 6,336,520 | B1 | 1/2002 | Amacker |
| 6,367,585 | B1 | 4/2002 | Fast |
| 6,371,142 | B1 | 4/2002 | Battiston |
| 6,386,321 | B1 | 5/2002 | Muhich |
| 6,405,114 | B1 | 6/2002 | Priestley |
| 6,431,632 | B1 | 8/2002 | Kozikowski et al. |
| 6,443,687 | B1 | 9/2002 | Kaiser |
| 6,480,778 | B2 | 11/2002 | Tanaka et al. |
| 6,488,161 | B1 | 12/2002 | Bean |
| 6,540,039 | B1 | 4/2003 | Yu et al. |
| 6,564,955 | B2 | 5/2003 | Franzen |
| 6,595,530 | B2 | 7/2003 | Wood |
| 6,827,176 | B2 | 12/2004 | Bean et al. |
| 6,866,120 | B1 | 3/2005 | Butterworth |
| 6,883,641 | B2 | 4/2005 | Julien |
| 7,004,286 | B2 | 2/2006 | Fredette |
| 7,065,436 | B2 | 6/2006 | Hara |
| 7,198,278 | B2 | 4/2007 | Donaldson |
| 7,246,684 | B2 | 7/2007 | Bean |
| 7,425,004 | B2 | 9/2008 | Donaldson |
| 7,448,470 | B2 | 11/2008 | Brown et al. |
| 7,631,714 | B2 | 12/2009 | Dower |
| 7,648,002 | B2 | 1/2010 | Easton et al. |
| 7,717,210 | B2 | 5/2010 | Mahy et al. |
| 7,823,694 | B2 | 11/2010 | Motes |
| 7,832,741 | B2 | 11/2010 | Donaldson |
| 7,861,820 | B1 * | 1/2011 | Goodwin ............ B66F 9/07572 180/408 |
| 7,971,685 | B2 | 7/2011 | Simone |
| 7,992,659 | B2 | 8/2011 | Schaedler et al. |
| 8,073,592 | B2 | 12/2011 | Nishimori et al. |
| 8,103,418 | B2 | 1/2012 | Osswald et al. |
| 8,123,300 | B2 | 2/2012 | Stoffer |
| 8,215,441 | B2 | 7/2012 | Wierzba et al. |
| 8,262,109 | B1 | 9/2012 | Bell et al. |
| 8,267,222 | B2 | 9/2012 | Cui |
| 8,290,658 | B2 * | 10/2012 | Sugitani ................. B62D 7/148 701/36 |
| 8,332,089 | B2 | 12/2012 | Nakazawa |
| 8,392,068 | B2 | 3/2013 | Yamazaki |
| 8,490,747 | B2 | 7/2013 | Winslow et al. |
| 8,505,684 | B1 | 8/2013 | Bogue |
| 8,522,920 | B1 | 9/2013 | Salyer |
| 8,622,170 | B2 | 1/2014 | Bean |
| 8,627,925 | B2 | 1/2014 | Webster |
| 8,631,902 | B2 | 1/2014 | Crook |
| 8,651,237 | B2 | 2/2014 | Pulliam |
| 8,678,135 | B2 | 3/2014 | Crook et al. |
| 8,789,653 | B2 | 7/2014 | Priest |

(56) References Cited

U.S. PATENT DOCUMENTS 8,888,122 B2 11/2014 Berry
9,108,831 B2 8/2015 Beji
9,174,488 B2 11/2015 Berry
9,212,038 B1 12/2015 Presti
9,238,477 B2 * 1/2016 Ahern .................. B66F 11/042
9,245,434 B2 1/2016 Baillargeon
9,254,865 B2 2/2016 Schaedler et al.
9,254,866 B2 2/2016 Dawson et al.
9,366,042 B2 6/2016 Weston
9,387,881 B2 7/2016 Smith
9,394,112 B2 7/2016 Andreoli
9,434,412 B2 9/2016 Clark
9,499,348 B2 11/2016 Teichrob
9,617,788 B2 4/2017 Goodson
9,883,741 B2 2/2018 Demasi
9,938,732 B1 4/2018 Hay
9,986,732 B1 6/2018 Pope
10,004,651 B2 6/2018 DeLuca et al.
10,060,142 B2 8/2018 Haessler et al.
10,065,843 B2 * 9/2018 Ahern .................. B66F 11/042
10,118,810 B2 11/2018 Ahern et al.
10,322,920 B2 6/2019 Shi
D856,623 S 8/2019 Jilbert
D859,773 S 9/2019 Beamish et al.
10,427,926 B2 10/2019 Mourlam
10,472,175 B2 11/2019 Minoura
10,520,241 B1 12/2019 Nelson
10,787,192 B1 9/2020 Katzourakis et al.
10,810,851 B2 10/2020 Baillargeon
10,857,058 B1 12/2020 Casibang
10,912,293 B1 2/2021 Miller
10,918,203 B1 2/2021 Schneider
11,007,944 B1 5/2021 Hanser
11,247,886 B2 2/2022 Fritel et al.
11,311,779 B2 4/2022 Hines
11,661,319 B2 5/2023 Mellott
12,037,058 B2 * 7/2024 St-Germain ............. B62D 5/20
2002/0027042 A1 3/2002 Beji
2003/0019670 A1 * 1/2003 Matz ...................... B62D 5/001 180/6.44
2004/0062630 A1 4/2004 Marrero
2004/0129491 A1 * 7/2004 Bean ..................... B60B 35/003 180/21
2004/0140147 A1 * 7/2004 Laurent ................ B62D 5/0418 180/402
2004/0149498 A1 8/2004 Nakashima
2005/0056484 A1 3/2005 Fredette
2005/0110262 A1 5/2005 LeBlanc et al.
2005/0183896 A1 8/2005 Fenelli et al.
2005/0189168 A1 9/2005 Bean
2006/0151252 A1 7/2006 Joos
2006/0225955 A1 10/2006 Murphy
2007/0168095 A1 * 7/2007 Wierzba ................ B66C 19/005 701/41
2007/0175702 A1 8/2007 Simone
2007/0187184 A1 8/2007 Nasuti et al.
2007/0261919 A1 11/2007 Roe
2008/0030037 A1 2/2008 Lombardi
2008/0087484 A1 4/2008 Fenelli et al.
2008/0097666 A1 4/2008 Oba et al.
2008/0105498 A1 5/2008 Perkins
2008/0149420 A1 6/2008 Cheatham
2008/0302601 A1 12/2008 Baker
2009/0140502 A1 * 6/2009 Sasaki ................... B62D 17/00 280/5.522
2009/0218166 A1 9/2009 Newton
2009/0321186 A1 12/2009 Louchart
2010/0106375 A1 4/2010 Ahmed et al.
2010/0191405 A1 * 7/2010 Sugitani ................. B60G 7/006 701/31.4
2010/0193290 A1 8/2010 Cui
2010/0200332 A1 8/2010 Bowden
2010/0224343 A1 9/2010 Fukuma et al.
2011/0224872 A1 9/2011 Reed
2012/0006619 A1 1/2012 Dubose
2012/0024629 A1 2/2012 Berry
2012/0043159 A1 2/2012 Clark et al.
2012/0181144 A1 7/2012 Turek
2012/0186908 A1 7/2012 Crook et al.
2012/0217091 A1 8/2012 Baillargeon et al.
2013/0144476 A1 6/2013 Pinto et al.
2013/0184960 A1 7/2013 Wetterer et al.
2014/0020978 A1 1/2014 Weston
2014/0084641 A1 3/2014 Moody
2014/0110190 A1 4/2014 Sollers
2014/0303846 A1 10/2014 Hayama et al.
2015/0134202 A1 5/2015 Dawson et al.
2015/0210520 A1 7/2015 Ahern et al.
2015/0246684 A1 * 9/2015 Ahern ................. B62D 5/0457 182/69.5
2016/0069094 A1 3/2016 Lombardi et al.
2016/0144890 A1 * 5/2016 Kim ....................... B62D 6/002 701/41
2016/0178123 A1 6/2016 Beaver
2016/0318550 A1 * 11/2016 Brooks ................ B62D 15/025
2017/0081162 A1 * 3/2017 Ahern .................. B66F 11/042
2017/0202727 A1 7/2017 Wegener et al.
2018/0057333 A1 3/2018 Gale et al.
2018/0162708 A1 6/2018 Pithoud
2018/0251354 A1 9/2018 Mohlman et al.
2018/0354762 A1 12/2018 Altizer
2019/0194007 A1 6/2019 Mourlam
2019/0210852 A1 7/2019 Fritel et al.
2019/0309901 A1 10/2019 Crook
2019/0322511 A1 10/2019 Penicaud et al.
2019/0330034 A1 10/2019 Crook
2019/0336828 A1 11/2019 Hines
2020/0003607 A1 1/2020 Bafile et al.
2020/0317256 A1 10/2020 Hao et al.
2020/0317489 A1 10/2020 Bhatia et al.
2020/0317494 A1 10/2020 Bafile et al.
2021/0017774 A1 1/2021 Phan
2021/0180345 A1 6/2021 Pietila et al.
2021/0188345 A1 6/2021 St-Germain et al.
2021/0221450 A1 7/2021 Sobotka et al.
2021/0276849 A1 9/2021 Shafer et al.
2022/0135381 A1 5/2022 Mellott
2023/0234636 A1 * 7/2023 Dye ...................... B66F 11/042
2023/0286571 A1 * 9/2023 Hao ..................... B62D 5/0421
2024/0043073 A1 * 2/2024 Prashant Rao ..... B60L 15/2036

FOREIGN PATENT DOCUMENTS

CN 207618972 U 7/2018
DE 4120584 A1 12/1992
EP 0525903 A1 2/1993
EP 0624500 A1 11/1994
EP 1350755 A1 10/2003
EP 1491489 A2 12/2004
EP 2213549 A1 8/2010
EP 2641860 A1 9/2013
EP 2479135 B1 5/2016
EP 3023544 A1 5/2016
FR 2266656 A1 10/1975
FR 2626865 A1 8/1989
FR 2701940 A1 9/1994
FR 2703673 A1 10/1994
GB 1504969 3/1978
GB 2479202 A 10/2011
JP 2011032083 A 2/2011
KR 200419510 Y1 6/2006
NL 1013468 C2 5/2001
WO 2019072379 A1 4/2019
WO 2019189095 A1 10/2019
WO 2019189097 A1 10/2019
WO 2019189101 A1 10/2019

OTHER PUBLICATIONS

Lateral control strategy for autonomous steering of Ackerman-like vehicles, retrieved Nov. 9, 2022 from "https://www.sciencedirect.com/science/article/abs/pii/S0921889003001519".

(56) References Cited

OTHER PUBLICATIONS

Differential Speed Steering Control for Four-Wheel Independent Driving Electric Vehicle from International Journal of Materials, Mechanics and Manufacturing, vol. 1, No. 4, Nov. 2013 retrieved Nov. 9, 2022 from "https://ieeexplore.ieee.org/abstract/document/6563667".
European Search Report for European patent application EP19170465 retrieved Nov. 10, 2022 from "https://worldwide.espacenet.com/patent/search/family/066248550/publication/EP3560887A1?q=pn%3DUS2019330034A1".
Advertisement for Genie Lift Tools Access Deck For Scissor Lifts retrieved Nov. 9, 2022 from file history of U.S. Appl. No. 16/275,854.
Advertisement for XSTEP SKYJACK retrieved Nov. 9, 2022 from file history of U.S. Appl. No. 16/275,854.
UpRight X26 Ultra Narrow Scissor Lift Parts Manual retireved Nov. 10, 2022 from "https://www.epartsplus.com/media/pdf/documentations/upright/service-parts-manuals/114102-000_X26UN-s-n%2020000-29999-Parts-only-Domestic.pdf".
Man Lift SHU Scissor Lift Attachment retrieved Nov. 10, 2022 from "http://if-manlift.com/products/shu/".
English abstract for foreign patent document AT406359B.
English abstract for foreign patent document CN207618972U.
English abstract for foreign patent document EP1350755A1.
English abstract for foreign patent document EP2213549A1.
English abstract for foreign patent document KR200419510Y1.
English abstract for foreign patent document NL1013468C2.
International Search Report and Written Opinion in PCT/2023/11595.
English Abstract of DE4120584A1 retrieved from Espacenet at https://worldwide.espacenet.com/patent/search/family/006434482/publication/DE4120584A1?q=pn%3DDE4120584A1.
English Abstract of EP0525903A1 retrieved from Espacenet at https://worldwide.espacenet.com/patent/search/family/006436182/publication/EP0525903A1?q=pn%3DEP0525903A1.
English Abstract of EP0624500A1 retrieved from Espacenet at https://worldwide.espacenet.com/patent/search/family/006488406/publication/EP0624500A1?q=pn%3DEP0624500A1.
English Abstract of FR2266656A1 retrieved from Espacenet at https://worldwide.espacenet.com/patent/search/family/009137215/publication/FR2266656A1?q=pn%3DFR2266656A1.
English Abstract of FR2626865A1 retrieved from Espacenet at https://worldwide.espacenet.com/patent/search/family/009363066/publication/FR2626865A1?q=pn%3DFR2626865A1.
English Abstract of FR2701940A1 retrieved from Espacenet at https://worldwide.espacenet.com/patent/search/family/009444843/publication/FR2701940A1?q=pn%3DFR2701940A1.
English Abstract of JP2011032083A retrieved from Espacenet at https://worldwide.espacenet.com/patent/search/family/043761539/publication/JP2011032083A?q=pn%3DJP2011032083A.
Manitou 150 TP, Wheeled Telescopic Boom Lifts (2007-2012) Specifications, retrieved Nov. 25, 2024 from https://www.lectura-specs.com/en/model/aerial-work-platform/telescopic-boom-lifts-wheeled-telescopic-boom-lifts-manitou/150-tp-1042552.

* cited by examiner

MOBILE ELEVATED WORK PLATFORM VEHICLES WITH NOVEL STEERING SYSTEM AND RELATED METHODS

FIELD OF THE INVENTION

This invention relates generally to novel steering mechanisms and control systems of motorized vehicles. More specifically, it relates to a compact steering system that does not require a steering linkage or other connection between a master and a follower wheel. The steering system may be operable to monitor the steer angle of a master wheel and a follower wheel and actively adjust a steering angle actuator of the follower wheel in response to the steer angle of the master wheel.

DISCUSSION OF THE BACKGROUND

Mobile elevated work platforms (MEWPs) are used to perform tasks at different heights and locations. Completing tasks in narrow spaces like ceiling grids can be difficult when the MEWP has a footprint that is wider or longer than the narrow space, which limits the allowable vertical travel of the platform. Conventional MEWPs typically having wheel assemblies that are connected by a mechanical linkage that spans the body of the vehicle. These mechanical linkages take up real estate in the central area of the chassis of the MEWP. This results in a chassis that is larger than would otherwise be necessary.

Additionally, the mechanical linkages result in steering geometries between the wheels (i.e., relative angles of the wheels) that do not follow an ideal steering geometry due to the rigidity and limitations of mechanical linkages. As the wheel assemblies turn, the mechanical linkages are unable to allow for ideal relative angles between the wheel assemblies according to, e.g., Ackermann steering geometry. This can lead to skidding and scuffing of the wheels during a turning operation, wear and tear on the wheel assemblies, and damage to the travel surface.

Therefore, improved, efficient, reliable, and compact steering systems and methods for MEWP, and similar small vehicles are needed. Such improved systems would facilitate improved vehicle performance and utility.

SUMMARY OF THE INVENTION

The present invention provides a vehicle steering system for mobile elevating work platform MEWP vehicles or other vehicles and methods for determining independent wheel steering angles such that a predetermined steering geometry between steerable wheels of the vehicle can be substantially achieved. The steering system provides an improved alignment protocol that determines angular positions of the independent master and follower wheels. In some embodiments, Ackermann geometry is utilized and the system is operable to determine a rotational position of a master wheel and translate such position into a corresponding target position of an independent follower wheel without mechanical linkage between the two. A system according to the disclosure coordinates the independent wheels based on electronic data providing angle differences of the steerable wheels and a predetermined steering geometry programmed into an electronic controller.

A vehicle utilizing the present steering system (e.g., a MEWP) may have a lower profile, smaller vehicle chassis, and/or smaller vehicle footprint due to the elimination of a mechanical connection of the master and follower wheels.

The absence of a mechanical connection between the actuators for the master and follower wheels also provides flexibility in the positioning of the steering actuators of the master and follower wheels to further allow for compact and efficient design of the vehicle.

An additional advantage of the steering system and method of the present invention is that the master and follower wheels can be more accurately adjusted with respect to the predetermined geometry (e.g., Ackerman geometry, parallel steering, etc.) than a conventional system that utilizes a mechanical linkage between steerable wheels. Mechanical linkages can roughly approximate the dynamic shifts in the steering geometry of a pair of coordinated steerable wheels. However, they're ability to match ideal steering geometries is limited due to somewhat crude mechanical arrangement of rigid linkage structures connecting, e.g., the steering yokes of the steerable wheels. The independent actuation of the master and follower wheels of the present invention under the guidance of an electronic controller (e.g., a microcontroller, PLC system, or general purpose computer) provides finer and more dynamic coordination of the independent wheel assemblies, allowing a significantly closer approximation of an ideal steering geometry (e.g., Ackermann geometry, parallel steering, etc.) through an entire range of toe angles (the angular direction of the tire relative to the centerline of the vehicle) of the master wheel. This closer approximation of the ideal steering geometry reduces skidding and scuffing of the vehicle's wheels on the ground when advancing through turns relative to mechanically linked systems. This, in turn, extends the useful life of the vehicle and prevents damage to the surfaces on which the vehicle travels.

The present steering system may utilize small electric actuators that are mechanically connected to each steering yoke and that are in electronic communication with an electronic controller. The electronic controller may be programmed with machine control programming operable to use position feedback from each electric actuator to calculate the ideal position for the follower wheel based on (1) the position change in the master wheel and (2) the selected ideal steering geometry. For example, the electronic controller may receive position data for the master wheel from a sensor (e.g., an encoder), and calculate the position change for the follower wheel as a difference between a calculated target angle (e.g., angle of intersection of the follower wheel axis with the master wheel axis on a virtual pivot center according to Ackerman geometry) and the current toe angle of the follower wheel (e.g., provided by an encoder) based on position feedback for the follower wheel, and then translating the position change value to an electrical signal communicable to the motor of the electric actuator of the follower wheel. The steering system is operable to coordinate the angular positions of the wheels according to a predetermined steering geometry (e.g., Ackerman steering) based on sensor data (e.g., encoder data) and/or electronic inputs from an electronic controller.

In some embodiments, the present invention provides a novel approach to determine geometry (e.g., Ackermann geometry) status of a steering system. The system is configured to receive a first signal representative of a first toe angle of the first steerable wheel (e.g., master wheel) and a second signal representative of a second toe angle of the second steerable wheel (e.g., follower wheel) when the first steerable wheel is positioned at the first toe angle. A target angle (e.g., according Ackermann geometry) for the follower wheel is calculated based on a wheelbase value representing the length of the vehicle's wheelbase, a wheelbase width value of the vehicle, and the first toe angle. The system determines an angle change for the follower wheel based on the present second toe angle and the calculated target angle (e.g., according Ackermann geometry). The presently disclosed method of achieving an ideal steering geometry provides an improved alignment procedure that yields an accurate target angle of the follower wheel that closely matches an ideal angular relationship between the master wheel and the follower wheel according to a selected steering geometry. The present disclosure provides a novel procedure to determine steering geometry based on a preferred steering geometry, which may be Ackerman geometry, but is not limited thereto.

In some embodiments, the electric actuators for the steerable wheels may be linear actuators positioned at or near an exterior wall of the vehicle. For example, the electric actuators may be linear actuators with a stroke length in a range of about 10 mm to about 500 mm (e.g., in a range of about 50 mm to about 250 mm, in a range of about 75 mm to about 125 mm, about 100 mm, or any value or range of values therein). In other embodiments, the electrical actuators may be rotary actuators positioned at or near the exterior wall of the vehicle chassis. For example, the electric actuators may be rotary actuators with an angle range of about 10° to about 360° (e.g., a range of about 30° to about 330°, a range of about 60° to about 270°, a range of about 90° to about 180°, or any value or range of values therein). There is no mechanical connection between the master and follower wheel assemblies, or between steering actuators associated with the master and follower wheel assemblies. This allows for a compact design, since there is no mechanical linkage between the master and follower wheel assemblies crossing the chassis. Each wheel assembly is nested and entirely housed in a lateral compartment without mechanical linkages crisscrossing the chassis.

In some embodiments, the electric actuators may include electronic position feedback devices (e.g., a magnetic position encoder, an optical position encoder, a potentiometer, etc.) operable to track the change in toe angle of the wheels and provide such toe angle data to the electronic controller via wired or wireless electronic communication. The position of the master control wheel may be controlled by human operator through a steering mechanism, such as a steer-by-wire system utilizing an operator control handle steering (e.g., a joystick steering mechanism), a rocker switch, a steering wheel, or other mechanism. Counterclockwise rotation or movement to the left of the steering mechanism may be calibrated to rotate the master wheel to a predetermined toe angle to the left, and clockwise rotation or movement to the right of the steering mechanism may be calibrated to rotate the master wheel to a predetermined toe angle to the right. The rotational position of the master wheel may be monitored by the position detection device (e.g., an encoder) in the master wheel and electronically transmitted to the electronic controller. The electronic controller may be programmed to then calculate a steer command to the follower wheel based on the change in position of the master wheel and the predetermined steer geometry selected for and programmed into the electronic controller of the steering system. Other appropriate calibrations of the steering actuators may also be utilized.

The steering system of the present invention may utilize open-loop control with respect to the steering of the master wheel and closed-loop control with regard to (1) monitoring a position of the master wheel, (2) monitoring a position of a follower wheel, and (3) steering the follower wheel. The electronic controller may include a machine control programming that receives electronic data from the steering control mechanism operated by a human operator to determine the steering direction of the master wheel and the movement of the MEWP vehicle. The determination of the follower wheel direction may be determined utilizing encoder data from the master and follower wheel assemblies. Both the master and follower wheel assemblies may include an encoder (e.g., an optical encoder, magnetic encoder, potentiometer, or other accurate sensor) that is operable to provide accurate position data to the machine control programming and allow the controller to calculate the steering angle of the follower wheel. In some embodiments, the steering input by the operator (e.g., directional movement of joystick or rotation of a steering wheel) may be monitored by the controller and be sufficient data provided to the machine control programming to accurately monitor the steering angle of the master wheel.

The machine control programming of the electronic controller may include machine executable instructions (e.g., software, firmware, and/or other programming) stored on a memory and that enables one or more processors of said electronic controller to receive inputs from encoders regarding positions of the steerable wheels and utilize such data to control the steering angle of a follower wheel. The controller executing the machine control programming may be a microcontroller, PLC system, or general-purpose computer that is operable to utilize feedback position data from the position device of the master wheel and identifies its position with reference to a predetermined reference point in the range of toe angles. For example, the predetermined reference point may be the halfway point in the range of toe angles (e.g., with the wheel parallel to the midline of the vehicle) as the zero position. Rotation of the toe angle to either side will be in terms of a value relative to the zero point. For example, in the case of a linear actuator, the position of the wheel is determined by the distance of extension or retraction from the zero-position measurement, which may be halfway extension point of the linear actuator. In the case of a rotary actuator, the position of the wheel is determined by the angle of rotation clockwise or counterclockwise from the zero-position measurement, which may be the rotational position in which the wheel is parallel to the midline of the vehicle chassis. The controller executing the machine control programming may be operable to switch to treat either front wheel assembly as the master and may be operable the designation of the master wheel between the left and right wheel assemblies. For example, the operator interface may have a selection mechanism for choosing the left or right wheel assembly as the master wheel assembly.

The machine control programming may be programmed such that it recognizes the halfway point of the steering actuators of the master and follower wheel assemblies as the zero position therefor. The machine control programming may include an algorithm that utilizes the position data provided by the encoders associated with each of the master and follower wheel assemblies. For example, the machine control programming may utilize the following calculation for a linear actuator for rotating the follower wheel when the master wheel has been controlled to turn left (e.g., the condition in which the linear actuator is extended):

$$y = 0.0168x^3 + 0.2869x^2 - 0.5817x + 1, \text{ where}$$

$$x = \frac{\text{master 1/2 measured position}}{\text{master 1/2 full length position}}$$

$$\text{follower 1/2 actuator position} = \text{master 1/2 full length position} * y$$

In this example, the machine control programming may utilize the following calculation for rotating the follower wheel when the master wheel has been controlled to turn right (e.g., the condition in which the linear actuator is retracted):

$$y = (0.0168x^3 + 0.2869x^2 - 0.5817x + 1)^{-1}, \text{ where}$$

$$x = \frac{\text{master 1/2 measured position}}{\text{master 1/2 full length position}}$$

$$\text{follower 1/2 actuator position} = \text{master 1/2 full length position} * y$$

Generally, the controller may include a one or more processors for (1) receiving electronic data from encoders, motors, steering mechanisms, and other electrical and electronic devices in the MEWP vehicle, (2) executing the machine control programming, (3) retrieving and storing data store in a hard drive, RAM, and/or other memory in electronic communication with the one or more processors, and (4) perform other functions commonly performed by processors; a memory; a data storage device for storing data; an input device for inputting data; and a bus providing electronic communication between the input device, the memory, the data storage device, and the one or more processors. The controller may be in wired or wireless connection to the one or more propulsion motors, the encoders connected with the wheel assemblies, the steering mechanism and operator interface, the actuator of the retractable lifting mechanism, and other electrical devices and mechanisms present in the MEWP. The controller may be operable to send commands via electronic signal to each of the electrical devices incorporated into the MEWP vehicle.

The steering system and method may be incorporated into a MEWP adjustable platform vehicle or scissor lift. The scissor lift may include the vehicle chassis having a central cavity for housing a retractable lifting mechanism, the retractable lifting mechanism, base, an actuator for extending and lowering the retractable lifting mechanism, and a platform assembly. The retractable lifting mechanism may extend away from the central cavity by activation of the actuator. The MEWP may have retractable lifting mechanism. In some embodiments, the retractable lifting mechanism may be an extendable scissor lift mechanism. The scissor lift mechanism may include a series of linked, foldable support members connected to one another using central pivot pins and outer pivot pins. The support members include lowermost foldable support members pivotally coupled to the interior of the central compartment of the chassis and the uppermost foldable support members may be pivotally coupled to an underside of the platform assembly. Alternatively, the retractable lifting mechanism may be an extendable (e.g., telescoping) boom stowable in and connected to the central compartment of the chassis, and the distal end of the boom may be connected to the platform assembly, such as that disclosed in U.S. patent application Ser. No. 17/010,735, filed on Sep. 3, 2020, which is incorporated herein in its entirety by this reference.

The platform assembly is positioned superior to and in mechanical connection with the retractable lifting mechanism and may move vertically relative to the base with the extension of the retractable lifting mechanism. The platform assembly may include guardrails, a cage, or basket in which a human operator may be safely positioned, such as that disclosed in U.S. patent application Ser. No. 16/275,854, filed on Feb. 14, 2019, which is incorporated herein in its entirety by this reference. Operator controls may be positioned and mounted in an operator interface positioned inside the guardrails, cage, or basket. The operator controls include lift, drive and steer controls. The steer controller may be a proportional-drive joystick, a steering wheel, two-axis rocker controls, or other appropriate steering mechanisms. The operator interface may further include control features for directing boom functions such as up/down or extend/retract, platform level and platform rotation, engine start, and other functionalities. The operator controls may be in electronic communication with the electronic controller.

The chassis may house one or more motors in mechanical connection with the wheels (e.g., the rear wheels) for rotating the wheels and propelling the vehicle. The one or more motors may be, e.g., an electric motor, hydraulic drive, or other appropriate device. In some embodiments, the one or more propulsion motors may be in mechanical connection with the rear wheels. The rear wheels may be directionally static, such that they are not utilized for steering the vehicle. Each rear wheel may be in mechanical connection with a separate motor, each in electronic communication with the controller, which may send electronic control signals to the motors through wired or wireless connections. The MEWP may also include a ground control panel in the chassis that allows the lift functions or other functions to be operated from the ground, allowing service technicians, ground personnel, or others to operate the MEWP or override the platform controls in certain situations (e.g., malfunction, emergency situations, etc.).

Still other advantages of the present disclosure will become readily apparent from the following detailed description, simply by way of illustration of the disclosure and not limitation. As will be realized, the disclosure is capable of other and different embodiments, and its several details are capable of modifications in various obvious respects, all without departing from the disclosure. Accordingly, the drawing and description are to be regarded as illustrative in nature, and not as restrictive.

DETAILED DESCRIPTION OF THE DRAWINGS

Figure 1:
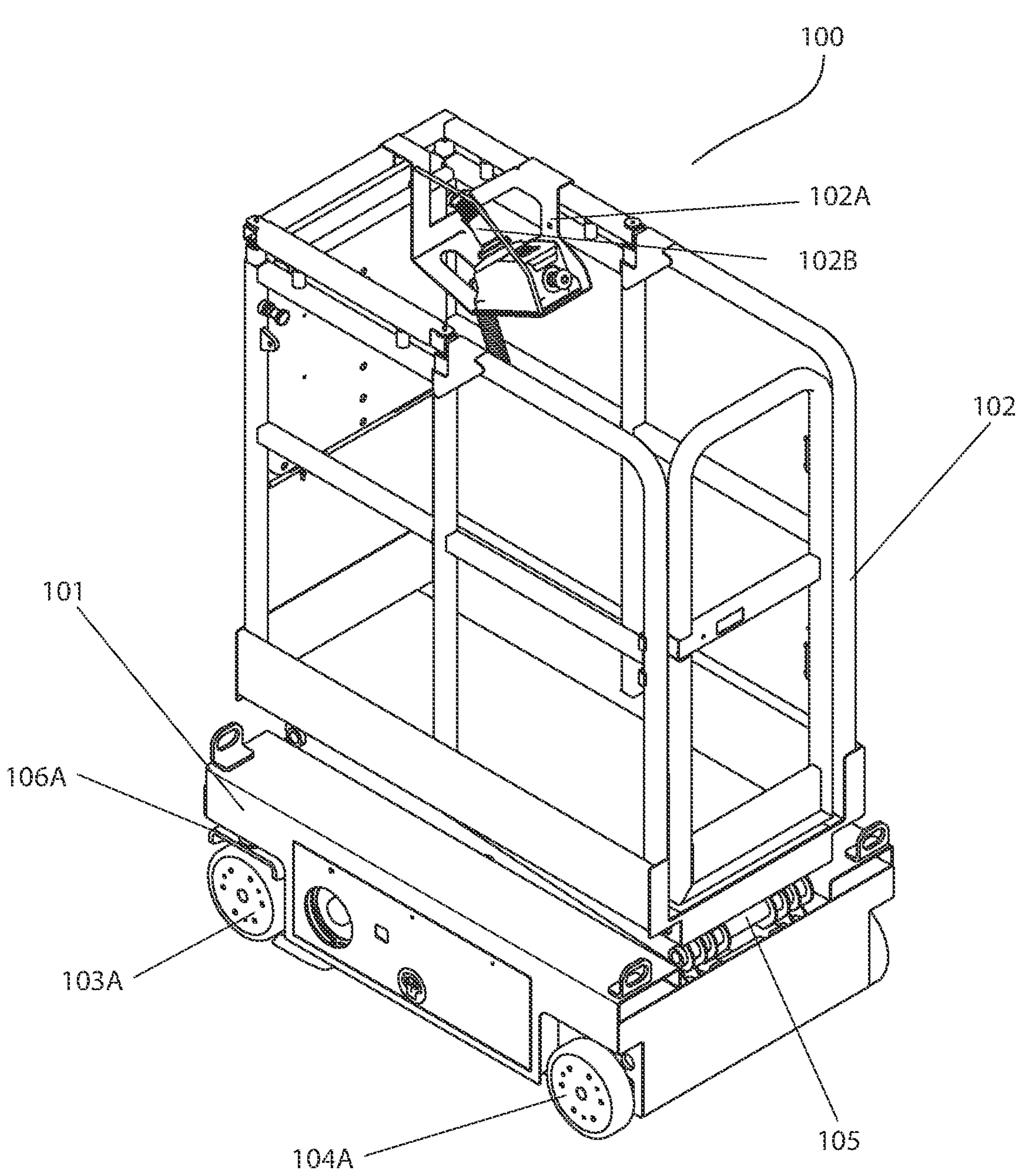
FIG. 1 provides a perspective view of a MEWP vehicle according to an embodiment of the present invention.
Figure 2:
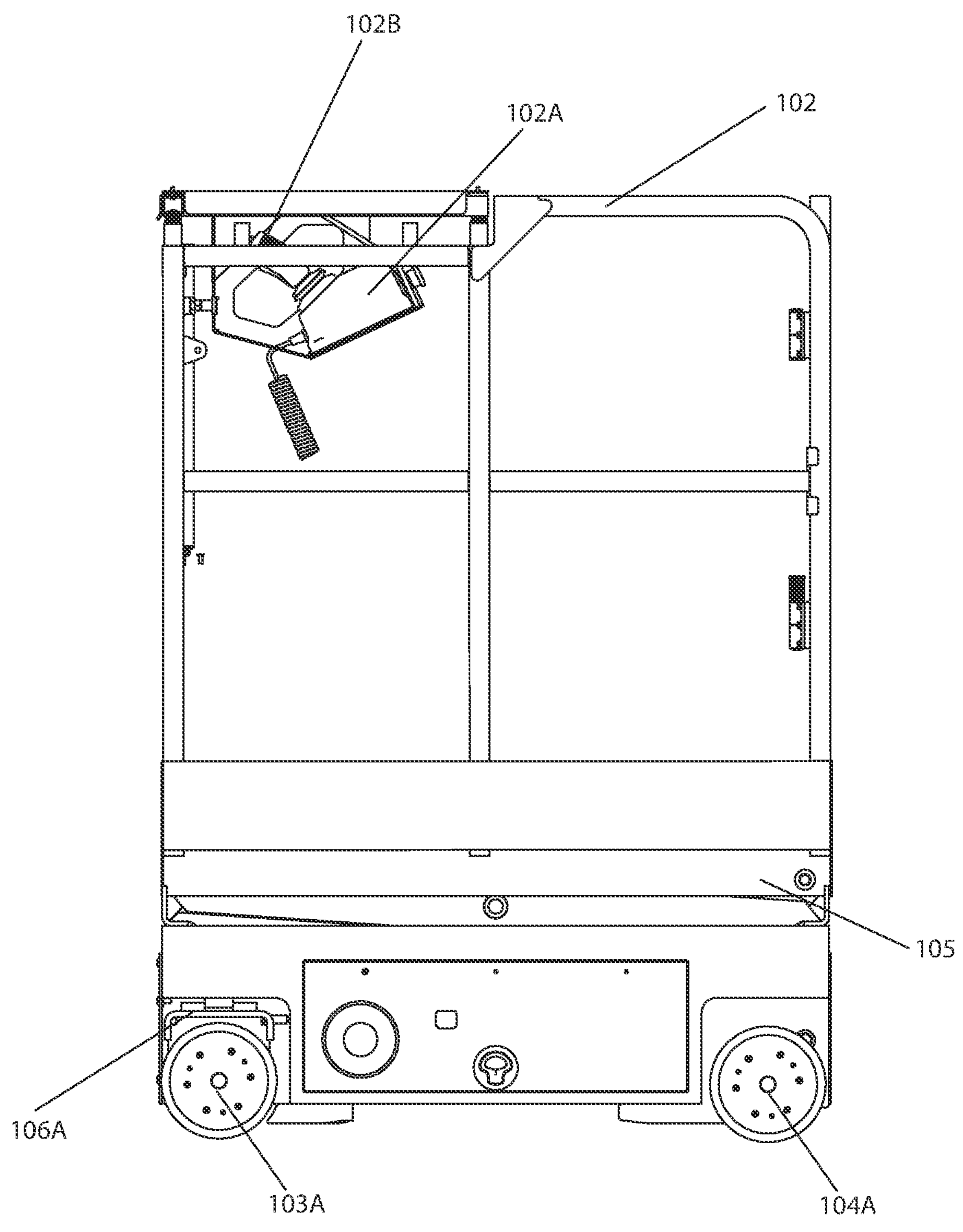
FIG. 2 provides a first side view of a MEWP vehicle according to an embodiment of the present invention.
Figure 3:
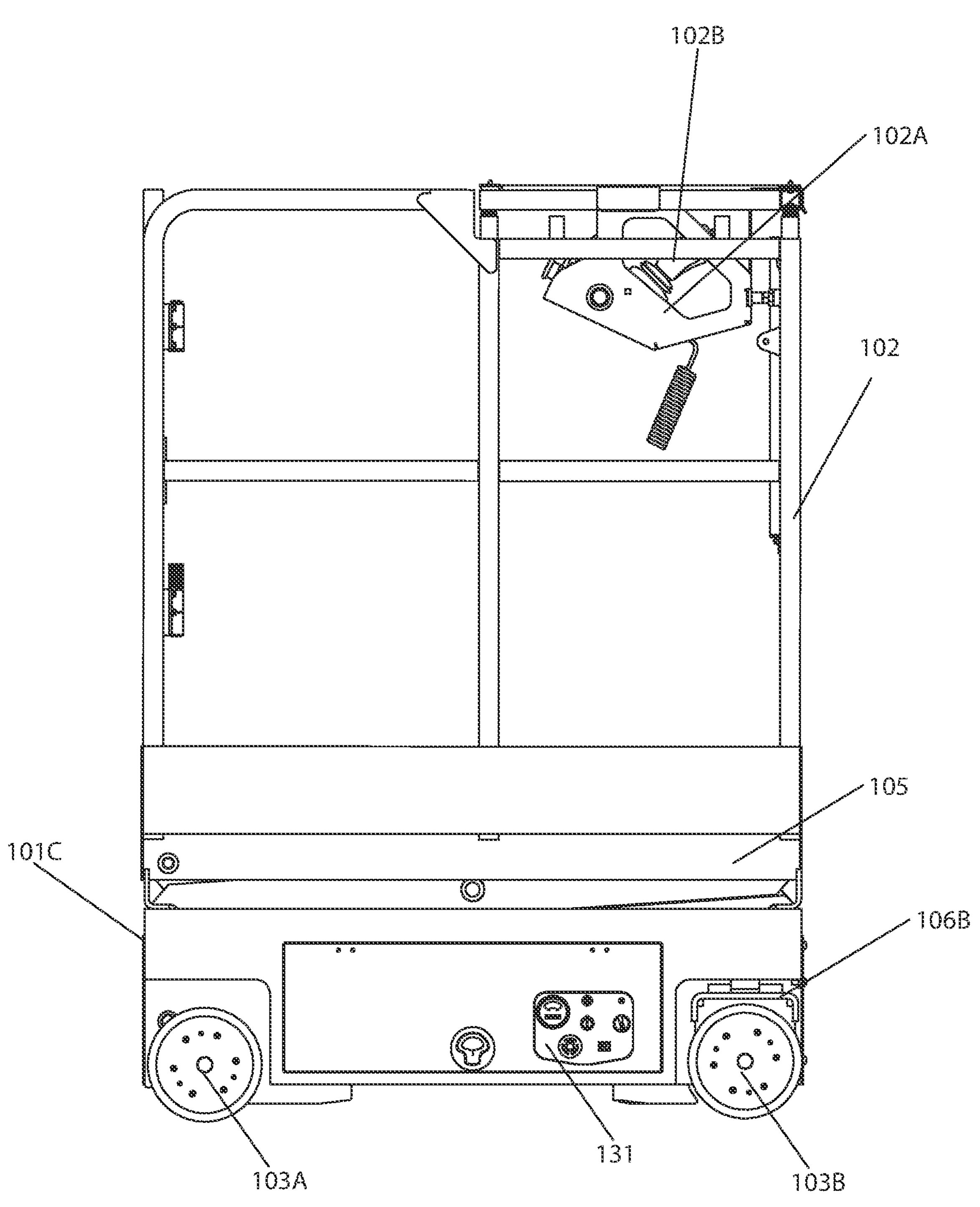
FIG. 3 provides a second side view of a MEWP vehicle according to an embodiment of the present invention.
Figure 4:
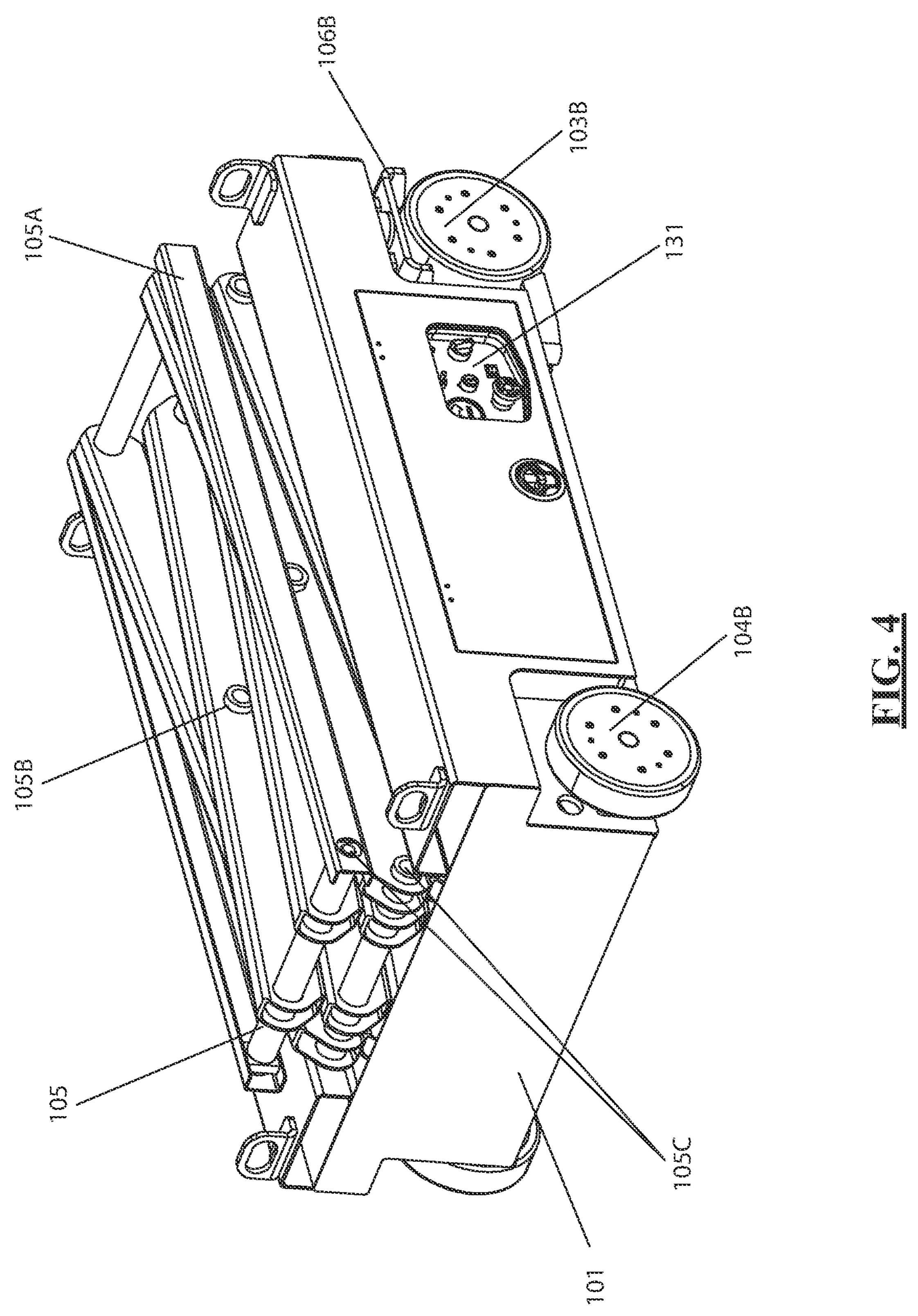
FIG. 4 provides a perspective view of a MEWP vehicle according to an embodiment of the present invention with the platform assembly removed revealing lower structures.

Reference will now be made in detail to certain embodiments of the invention, examples of which are illustrated in the accompanying drawings. While the invention will be described in reference to these figures and certain implementations and examples of the embodiments, it will be understood that such implementations and examples are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. References to various features of the "present invention" throughout this document do not mean that all claimed embodiments or methods must include the referenced features. It will be apparent to one skilled in the art that the present invention may be practiced without these specific details or features.

Reference will be made to the exemplary illustrations in the accompanying drawings, and like reference characters may be used to designate like or corresponding parts throughout the several views of the drawings.

Referring to FIGS. 1-9, a MEWP vehicle 100 is shown. The MEWP vehicle 100 can be a scissor lift vehicle, boom lift vehicle, or similar vehicle, and is shown as a scissor lift in FIG. 1. The MEWP vehicle 100 includes a vehicle chassis 101 having a central compartment 101*a*, a first lateral compartment 101*b*, and a second lateral compartment 101*c*, which may each serve to house various components of the MEWP vehicle 100. The vehicle 100 includes a retractable lifting mechanism 105 that is nested and stored in central compartment 101*a* when in the retracted position. The retractable lifting mechanism 105 may be coupled to the chassis 101 and may support a platform assembly 102. The platform assembly 102 may be connected to the superior portion of the retractable lifting mechanism 105, such that the platform assembly 102 is raised as the retractable lifting mechanism 105 is extended from the central compartment 101A.

Figure 5:
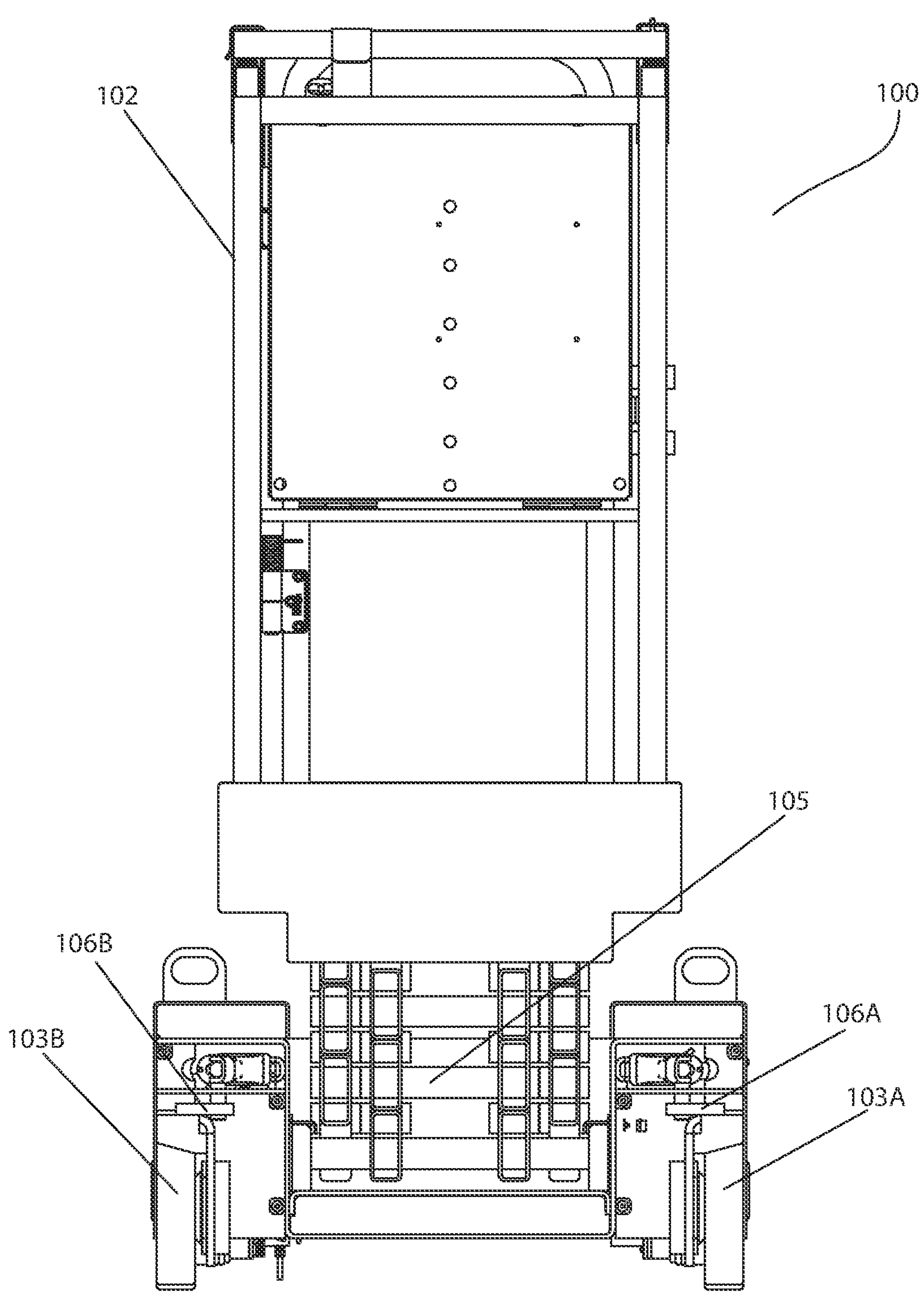
FIG. 5 provides a front view of a MEWP vehicle according to an embodiment of the present invention with the front plate of the chassis removed revealing interior structures.

As depicted in FIG. 1, the retractable lifting mechanism 105 is a scissor lift structure formed of a series of linked, foldable support members 105A connected to one another using central pivot pins 105B and outer pivot pins 105C. The central pivot pins 105B and outer pivot pins 105C extend through adjacent support members 105A to pivotally couple the support members 105A in an assembly that is vertically extendable and retractable. The lowermost foldable support members 105A may be pivotally coupled to the central compartment 101A and the uppermost foldable support members 105A may be pivotally coupled to an underside of the platform assembly 102. FIG. 5 provides a front view of the MEWP 100 with the front exterior panel of the chassis 100 removed. The retractable lifting mechanism 105 is shown in the retracted position. It can be seen that the retractable lifting mechanism 105 is contained in the central compartment 101A of the chassis 101.

Figure 6:
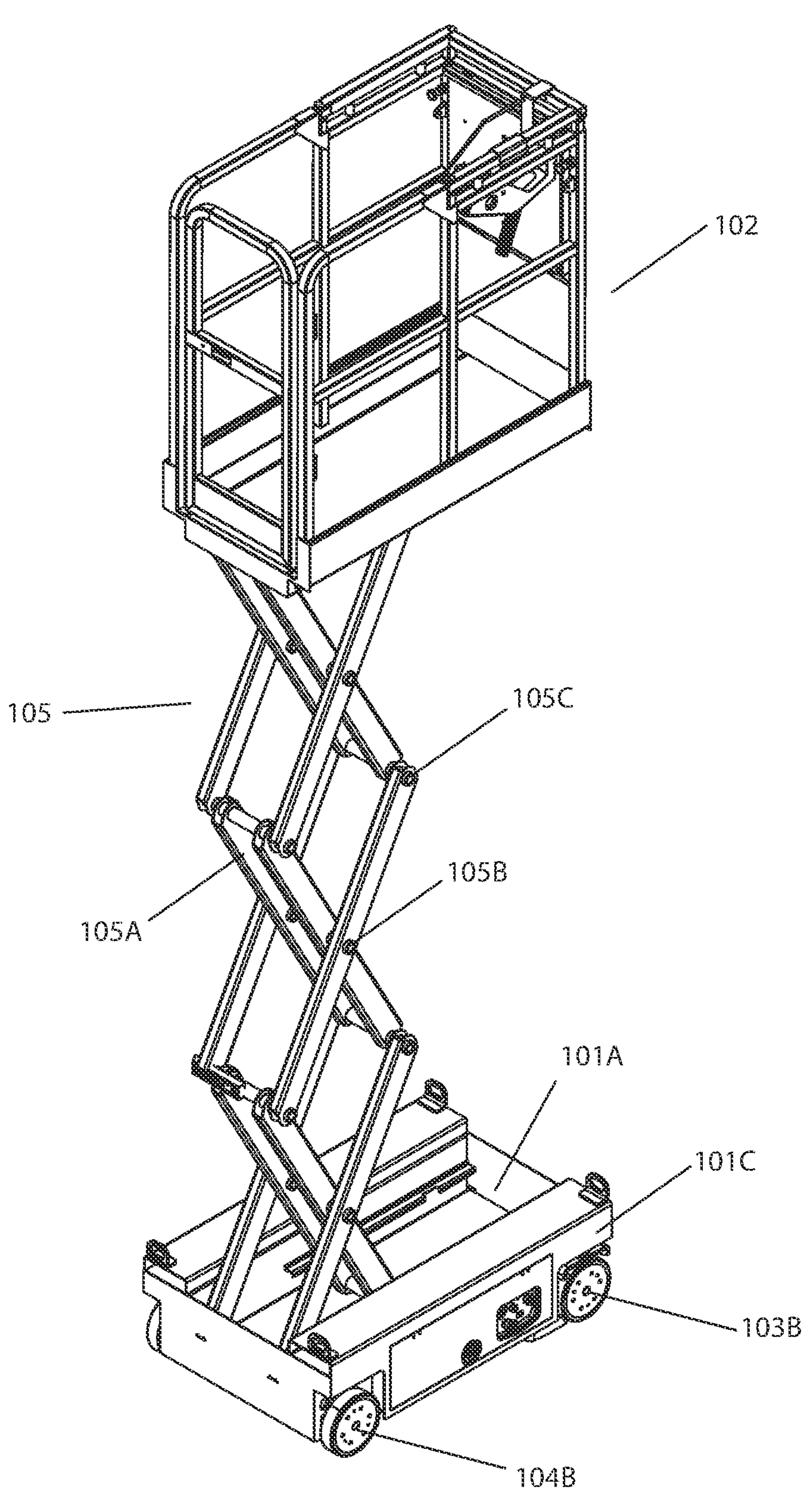
FIG. 6 provides a perspective view of a MEWP vehicle according to an embodiment of the present invention with the platform assembly extended and elevated.

Adjusting the angular relationships between adjacent support members 105A vertically away from the chassis 101 and away from one another extend the retractable lifting mechanism 105, and alters the position (the height) of the platform assembly 102 relative to the chassis 101. The foldable support members 105A of the retractable lifting mechanism 105 are folded or unfolded using a lift actuator (not shown), such as a hydraulic cylinder, pneumatic cylinder, electric linear actuator, or other appropriate actuator. The lift actuator may be in electronic communication with controller 140 and may be controlled by an operator through the operator interface 102 or ground controls 131. The lift actuator controls the position of the retractable lifting mechanism 105 by selectively applying force to the retractable lifting mechanism 105. For example, extending the actuator will raise the foldable support members and reversing the lift actuator will lower the foldable support members 105A. FIG. 6 shows the retractable lifting system 105 fully extended from the chassis 101.

Figure 7:
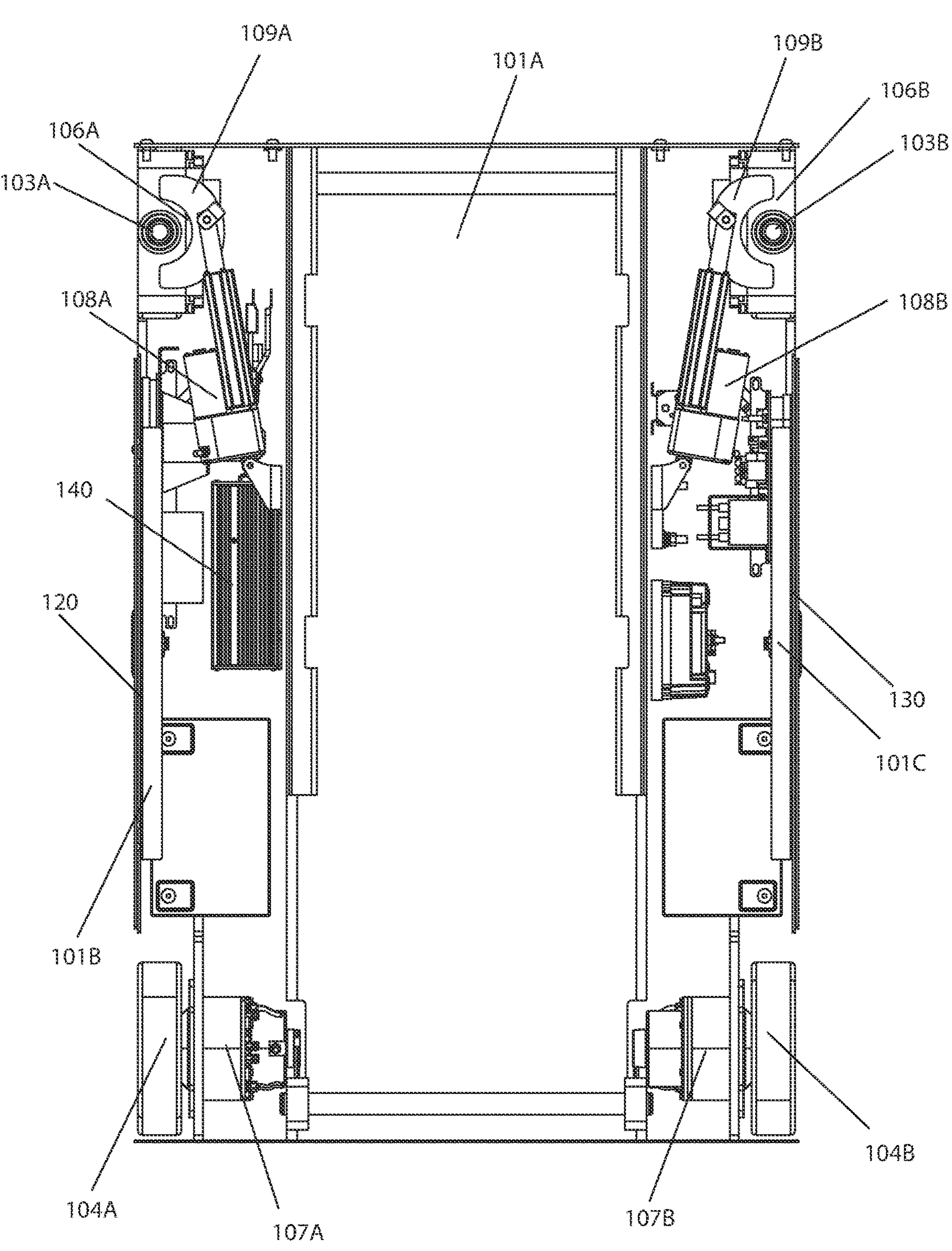
FIG. 7 provides an overhead view of an interior of a chassis of a MEWP vehicle according to an embodiment of the present invention.
Figure 8:
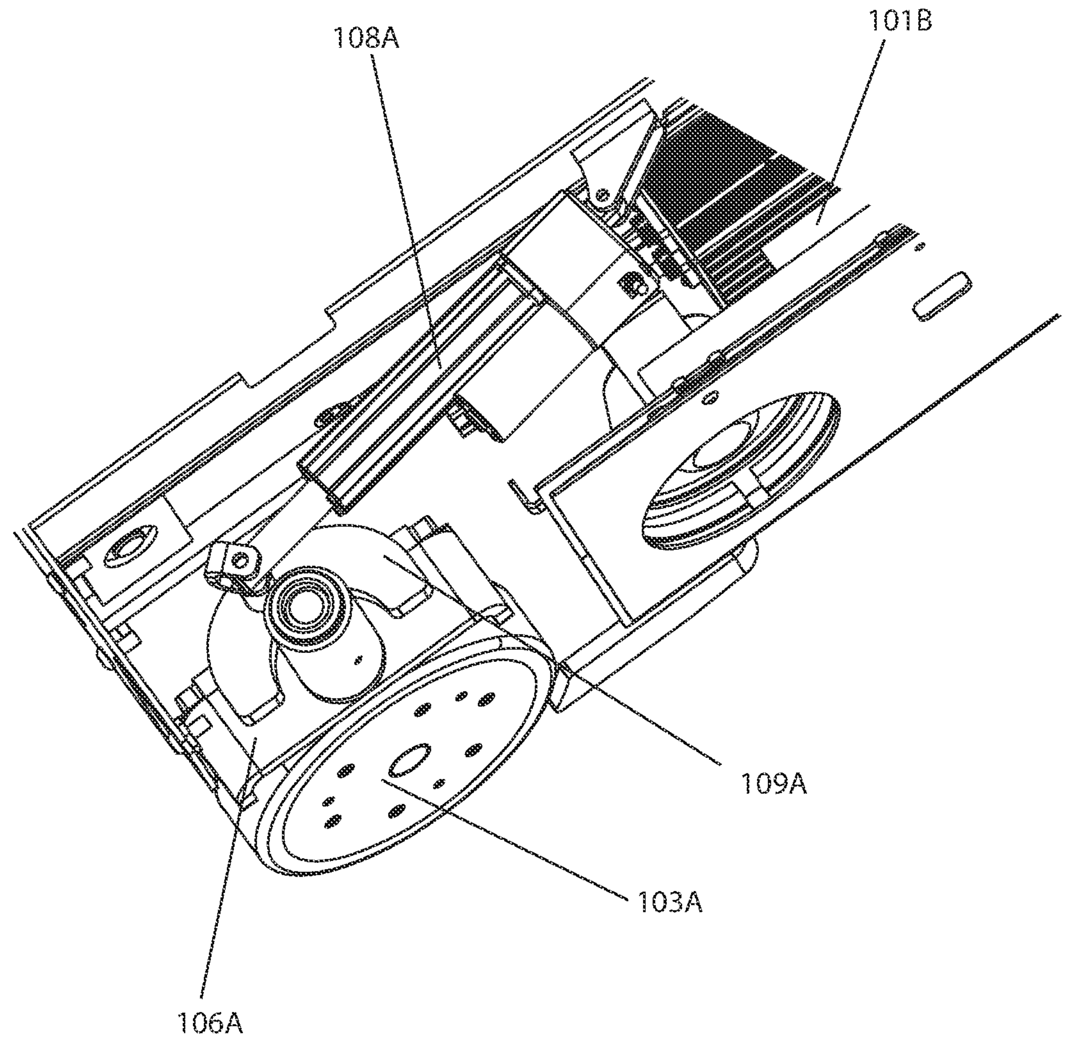
FIG. 8 provides a close-up view of an interior of a wheel compartment of a MEWP vehicle according to an embodiment of the present invention.

FIGS. 7-8 provide interior views of the chassis 101 and the structures therein. In some embodiments, the propulsion of the vehicle may be driven by electric motors 107A and 107B, which are in mechanical connection with the rear wheels 104A and 104B. Electrical motors 107A and 107B may be operable to propel rotation of wheels 104A and 104B, respectively. The electric motors 107A and 107B may be in electrical communication with the controller 140, and their operation may be controlled by the operator through an open loop command operation inputted through the operator interface 102A. In such embodiments, the steering commands may be routed directly from the steering input 102B to the electric motors 107A and 107B or may be routed through the controller 140 and relayed the electric motors 107A and 107B. The operator interface 102A may include the steering input 102B, which may be a rocker switch joystick, or other mechanism that allows the operator to select a direction based on, e.g., the steering switch commands and modulate speed based on speed controls provided at the operator interface 102A. The steering input 102B may electromechanical and may be in electronic communication with a controller 140.

In some embodiments, the steering signals may be sent from the steering input 102B to the controller 140 and then relayed by the controller 140 to the electric actuators 108A and 108B. The speed may be controlled by a speed control mechanism (e.g., a dial, a throttle switch, a depressible pad or switch, etc.) provided at the operator interface 102A. The controller 140 may track the direction and speed of the MEWP as directed by an operator through the steering input 102B. The rear wheels 104A and 104B may be directionally static, such that they are not utilized for steering the vehicle. Additionally, they may be independently mounted on the chassis 101, such that they are aligned, but not mechanically connected. The absence of a rear axle between the rear wheels 104A and 104B provides additional unobstructed space in the central compartment 101A for storage of the retractable lifting system 105. This aids in reducing the size and compactness of the chassis 101.

Front wheel assemblies 106A and 106B and rear wheel assemblies 104 may be mounted on lateral portions of the chassis 101. The front wheel assemblies 106A and 106B each having a yoke (109A and 109B, respectively) for connecting to an actuator for controlling steering of the wheel assembly. The steering system includes two separate steering actuators 108A and 108B that are independent and connected independently to wheel assemblies 106A and 106B, respectively. The steering actuator 108A is in mechanical connection with the wheel assembly 106A, and the steering actuator 108B is in mechanical connection with the wheel assembly 106B. There is no mechanical connection between the first wheel assembly 106A and the second wheel assembly 106B, or between steering actuators 108A and 108B. This allows for a compact design, since there is no mechanical linkage between the first and second wheel assemblies 106A and 106B crossing the central compartment 101A. The first wheel assembly 106A is nested and entirely housed in the first lateral compartment 101B and the second wheel assembly 106B is nested and entirely housed in the second lateral compartment 101C.

In some embodiments, the electric actuators 108A and 108B for the steerable wheels 103A and 103B may be linear actuators positioned at or near an exterior wall of the chassis. The electric actuators may be linear actuators with a stroke length in a range of about 10 mm to about 500 mm (e.g., in a range of about 50 mm to about 250 mm, in a range of about 75 mm to about 125 mm, about 100 mm, or any value or range of values therein). The actuators 108A and 108B are in electronic communication with the electronic controller 140 that provides the control signals to the actuators 108A and 108B.

The electronic controller 140 may be one or more general purpose computer(s) having at least one processor (Central Processing Unit [CPU]) operable to execute machine executable instructions and provide control signals to the actuators 108A and 108B, the boom actuator, motors 107A and 107B, and other electrical and electronic components of the vehicle 100. The system may further include other components that are well known to one of ordinary skill in the art needed for the function of the general-purpose computer (e.g., a power supply, hard drive, random access memory (RAM), internet connection devices and software, etc.). The system may include a logic unit (e.g., a package of executable instructions saved on the hard drive and executable by the processor) for receiving and processing electronic data. A machine control programming may be saved on a memory of the controller 140 and accessed and executed by the one or more processors of the controller 140. The controller 140 executing the machine control programming receives electronic data from the encoder of the master wheel electric actuator 108A to get an accurate determination of the steering angle of the master wheel. The follower wheel (e.g., wheel assembly 106B) steering angle may be determined in part from encoder data from the follower wheel electric actuator 108B. This data may be employed by the controller 140 executing the machine control programming to calculate a steering angle command for the follower wheel (e.g., wheel 103B).

The controller 140 may be operable to treat either front wheel assemblies as the master and may be operable to switch the designation of the master wheel between the left and right wheel assemblies. For example, the operator interface may have a selection mechanism for choosing the left or right wheel assembly as the master wheel assembly. The wheel assemblies selected as the master wheel may be under the direct control of the operator interface 102A. For example, the wheel assemblies 103A may be treated as the master wheel. The MEWP may utilize open-loop control with respect to the steering of the master wheel (e.g., wheel assembly 103A) and closed-loop control with regard to the follower wheel (e.g., wheel assembly 103B). Depression of a rocker switch on the operator interface 102 (or lateral movement of a joystick to the left in some embodiments) may be calibrated to rotate the master wheel to a predetermined toe angle to the left, and movement to the right may be calibrated to rotate the master wheel to a predetermined toe angle to the right. The rotational position of the master wheel may be monitored by the position detection device in the master wheel (e.g., an encoder in the electric actuator 108A) and electronically transmitted to the electronic controller 140 to provide the controller 140 with position data for the master wheel (e.g., wheel 103A). The electronic controller 140 executing the machine control programming may then calculate a steer command to the follower wheel (e.g., wheel 103B) based on the change in steering direction of the master wheel, the position of the follower wheel, and the predetermined steer geometry selected for and programmed into the machine control programming.

Upon the initiation of a turn of the master wheel (e.g., wheel 103A) by steering input on the steering input 102B, a target angle of the follower wheel (e.g., wheel 103B) may be determined by utilizing encoder data from the master wheel electric actuator 108A and from the follower wheel electric actuator 108B. The encoders for the master and follower wheel assemblies are operable to provide accurate position data to the controller 140 and allow the controller 140 to calculate the target steering angle of the follower wheel (e.g., wheel 103B). The electronic controller 140 executing the machine control programming is operable to receive feedback position data from the encoder of the master wheel (e.g., wheel 103A) and identify its position with reference to a predetermined reference point in the range of toe angles for the master wheel (e.g., wheel 103A). The position of the master wheel (e.g., wheel 103A) is determined by the distance of extension or retraction from the reference point, which may be halfway extension point of the linear actuator 108A. The position of the follower wheel (e.g., wheel 103B) is also determined by the distance of extension or retraction from the reference point, which may be halfway extension point of the linear actuator 108B. The controller 140 executing the machine control programming may calculate the target angle of the follower wheel based on the steering angles of the master wheel and the follower wheel after each instance that the steering angle of the master wheel changes. The calculation performed by the controller 140 utilizes the encoder position data from each linear actuator 108A and 108B and the predetermined steering geometry of the system. The encoders for the wheel steering actuators are not independently shown as they may be incorporated into linear actuator devices 108A and 108B In some embodiments, the predetermined steering geometry is Ackermann steering geometry.

Figure 9:
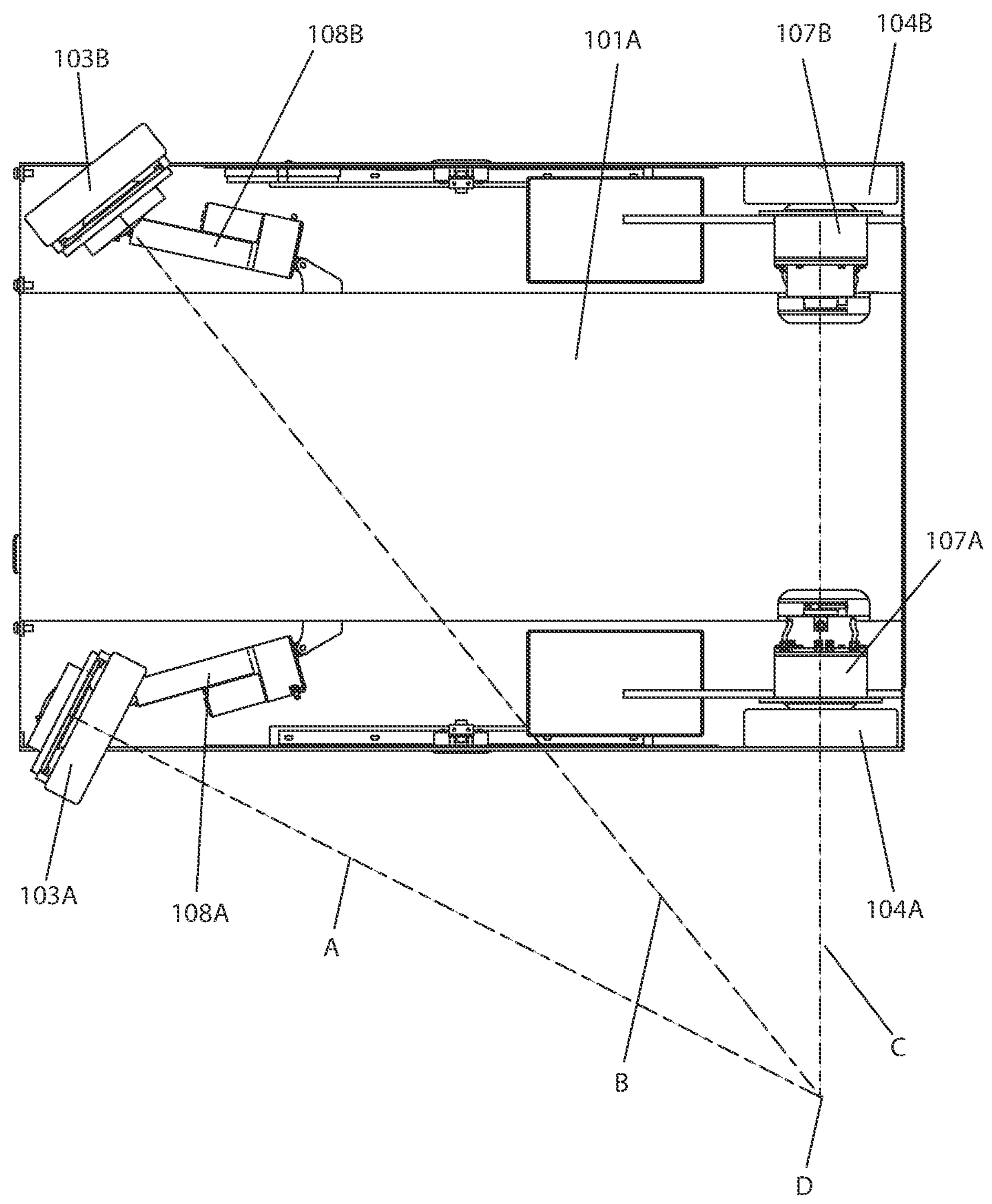
FIG. 9 provides an overhead view of an interior of a chassis of a MEWP vehicle during a turning operation according to an embodiment of the present invention.

FIG. 9 shows an exemplary turning operation according the present invention in which the predetermined steering geometry is Ackermann geometry. The fixed rear wheels 104A and 104B are aligned, but independently mounted for rotation without a connecting axle. The steerable master wheel assembly 103A and follower assembly 103B are rotatably mounted at or near the front of the chassis 101 in a laterally aligned arrangement, but are independently mounted without a connecting axle between them. The absence of axles between the front wheels and rear wheels allows them to be completely housed within the lateral compartments 101B and 101C of the chassis 101. This design conserves space in the central compartment 101A of the chassis 101 for housing the retractable lifting mechanism 105.

In Ackermann steering geometry, the outer wheel must turn at a lesser angle than the inner wheel to prevent scuffing of the wheels as the vehicle makes a turn. The center lines of the axes of the rear and front wheels are represented by the wheel axis lines A, B, and C. The lines A and B represent the axes of the master wheel assembly 103A and follower assembly 103B, respectively, and C represents the aligned axes of the rear wheels. A steering system having perfect Ackermann geometry will have an optimum rolling action relative to point D, where the axes A, B, and C intersect. As the master wheel is turned to a change in direction resulting from actuation of the master wheel actuator 108A directed by the steering input 102B, (1) the encoder of the master wheel assembly 103A measures and provides accurate data to the controller 140 of the change in the toe angle of the master wheel (e.g., angle A), (2) the encoder of the follower wheel assembly 103B measures and provides accurate data to the controller 140 of the toe angle of the follower wheel, (3) the controller calculates a target toe angle (e.g., angle B), and (4) the controller 140 sends a control signal to the follower wheel actuator 108B to turn the follower wheel from its current toe angle to the target toe angle (e.g., angle B) such that the axes of the master wheel and follower wheels intersect at the axis of the rear wheels (e.g., at point D) to achieve Ackermann steering geometry. This process is repeatedly on a continuous basis as the operator inputs various steering inputs to the steering mechanism as the operator drives the MEWP vehicle 100.

The steering system of the present invention is operable to coordinate the toe angles of the master and follower wheels through dynamic process of driving and steering the MEWP vehicle 100 more accurately according to a predetermined geometry (e.g., Ackerman geometry) than a conventional system that utilizes a mechanical linkage between steerable wheels. Mechanical linkages somewhat impair the ability of such systems to match an ideal Ackermann steering geometry. The independent actuation of the master and follower wheels of the present invention under the guidance of an electronic controller 140 provides finer and more dynamic coordination of the independent wheel assemblies, allowing a significantly closer approximation of an ideal steering geometry through an entire range of toe angles of the steerable wheels. This closer approximation of the ideal steering geometry reduces skidding and scuffing of the vehicle's wheels on the ground when advancing through turns relative to mechanically linked systems.

It is to be understood that variations, modifications, and permutations of embodiments of the present invention, and uses thereof, may be made without departing from the scope of the invention. It is also to be understood that the present invention is not limited by the specific embodiments, descriptions, or illustrations or combinations of either components or steps disclosed herein. The embodiments were chosen and described in order to best explain the principles of the invention and its practical application, to thereby enable others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed:

1. A mobile elevated work platform vehicle, comprising:

a. a vehicle chassis;

b. a first independently steerable wheel rotatably coupled to a first steering axis that is geometrically fixed relative to said vehicle chassis;

c. a first linear steering actuator in mechanical communication with said first independently steerable wheel and nested within a first lateral compartment of said vehicle chassis;

d. a second independently steerable wheel rotatably coupled to a second steering axis that is geometrically fixed relative to said vehicle chassis;

e. a second linear steering actuator in mechanical communication with said second independently steerable wheel and nested within a second lateral compartment of said vehicle chassis, wherein there is no mechanical steering connection between said first independently steerable wheel and said second independently steerable wheel; and f. a retractable lifting mechanism operable to extend away from and retract into said vehicle chassis, wherein said vehicle chassis includes a central compartment extending an entire length of said vehicle chassis, and wherein said retractable lifting mechanism is nested and stored in said central compartment when in a retracted position.

2. The vehicle of claim 1, further comprising directionally static rear wheels independently mounted at or near a back end of the vehicle chassis, wherein there is no mechanical linkage between the rear wheels.

3. The vehicle of claim 1, wherein the first steering actuator is nested within said first lateral compartment and is not present in said central compartment.

4. The vehicle of claim 1, wherein the second steering actuator is nested within a second lateral compartment and is not present in said central compartment.

5. The vehicle of claim 1, further comprising a controller having a processor for processing data, a memory, and a data storage device for storing data.

6. The vehicle of claim 5, wherein the data storage device stores machine readable instructions to cause the processor to perform the steps of:

a. receiving a first signal representative of a first toe angle of said first independently steerable wheel, wherein said first signal corresponds to a position of said first linear steering actuator, b. calculating a target toe angle for said second independently steerable wheel based on first toe angle and a predetermined steering geometry, c. receiving a second signal representative of a starting toe angle of said second independently steerable wheel, d. calculating an angular difference between said target toe angle and said starting toe angle to determine an angle adjustment for said second independently steerable wheel, and e. sending a steering command from said controller to said second linear steering actuator for said second independently steerable wheel to turn said second independently steerable wheel according to said angle adjustment.

7. The vehicle of claim 1, further comprising a retractable lifting mechanism actuator operable to extend said retractable lifting mechanism from the vehicle chassis and to retract said retractable lifting mechanism into said vehicle chassis.

8. The vehicle of claim 1, further comprising a platform assembly positioned at a superior end of the retractable lifting mechanism and operable to move vertically with extension of said retractable lifting mechanism.

9. The vehicle of claim 5, further comprising an operator input device for inputting data.

10. A mobile elevated work platform vehicle comprising:

a. a vehicle chassis having a central compartment, a first lateral compartment, and a second lateral compartment;

b. a first independently steerable wheel mounted to rotate about a first geometrically fixed steering axis relative to said vehicle chassis;

c. a first linear steering actuator in mechanical communication with said first independently steerable wheel and nested within said first lateral compartment;

d. a second independently steerable wheel mounted to rotate about a second geometrically fixed steering axis relative to said vehicle chassis;

e. a second linear steering actuator in mechanical communication with said second independently steerable wheel and nested within said second lateral compartment, wherein there is no mechanical linkage between said first independently steerable wheel and said second independently steerable wheel; and f. a controller having a processor for processing data, a memory, and a data storage device for storing data, wherein the data storage device has instructions, executable by the processor, to perform the machine-implemented steps of:

i. receiving a first signal representative of a first toe angle based on the position of said first linear steering actuator of said first independently steerable wheel, ii. calculating a target toe angle for said second independently steerable wheel based on a predetermined steering geometry, said position of said first linear steering actuator, and at least one wheelbase geometric dimension of said vehicle, iii. receiving a second signal representative of a second toe angle of said second independently steerable wheel;

iv. calculating an angular difference between said target toe angle and said second toe angle to create a steering command, and sending said steering command from said controller to said second linear steering actuator for said second independently steerable wheel to turn said second independently steerable wheel to the target toe angle.

11. The vehicle of claim 10, wherein said first signal representative of a first toe angle is determined by the positional displacement of said first linear steering actuator, wherein a neutral position of said first linear steering actuator aligns said first independently steerable wheel with said first lateral compartment, and wherein said first and second linear steering actuators are operatively connected to said first and second independently steerable wheels, respectively, such that an actuation of said first or second linear steering actuator induces a corresponding rotational movement of the associated independently steerable wheel about the geometrically fixed steering axis.

12. The vehicle of claim 11, wherein said second signal representative of a second toe angle is measured by an electromechanical sensor and is compared to the position of said second linear steering actuator to perform said calculating an angular difference between said target toe angle and said second toe angle.

13. The vehicle of claim 12, wherein said compared position of said linear steering actuator and said second toe angle generates a steering command for said second linear steering actuator to turn said second independently steerable wheel to the target toe angle until said angular difference between said target toe angle and said second toe angle is zero.

14. The vehicle of claim 10, wherein said at least one wheelbase geometry characteristic comprises a wheelbase value representing a length of a vehicle wheel base or a wheel base width value of said vehicle.

15. A method for determining steering geometry of a vehicle of a type having first and second independently steerable wheels, wherein each independently steerable wheel is mounted to rotate about a geometrically fixed steering axis relative to a vehicle chassis, and a steering system comprises a controller, wheel angle sensor devices for generating toe angle signals representative of toe angles of the steerable wheels, the method comprising the machine-implemented steps of:

i. receiving a first signal representative of a first toe angle of a first independently steerable wheel, wherein said first toe angle is determined relative to a predetermined reference point corresponding to a zero position of a first linear steering actuator associated with said first independently steerable wheel;

ii. calculating a target toe angle for a second independently steerable wheel based on a predetermined steering geometry;

iii. receiving a second signal representative of a second toe angle of a second independently steerable wheel;

iv. calculating an angular difference between said target toe angle and said second toe angle to create a steering command, wherein the steering command eliminates scrub of said second independently steerable wheel; and v. sending said steering command from said controller to a linear steering actuator for said second independently steerable wheel to turn said second independently steerable wheel.

16. The method of claim 15, further comprising the steps of:

a. determining an Ackermann angle of said second independently steerable wheel based on the toe angle of said first independently steerable wheel; and b. calculating an electrical signal value operable to actuate said linear steering actuator of said second independently steerable wheel to achieve said Ackermann angle; and c. transmitting said electrical signal value from said controller to said linear steering actuator of said second independently steerable wheel.

17. The method of claim 15, wherein the controller is further operable to receive a third signal representative of a third toe angle of the first independently steerable wheel when the first independently steerable wheel is being turned to a second direction by manipulation of a steering mechanism, wherein said third toe angle is determined by the position of said first linear steering actuator.

18. The method of claim 17, calculating a second target toe angle for said second independently steerable wheel based on said third toe angle and said predetermined steering geometry.

19. The method of claim 18, calculating a second angular difference between said second target toe angle and a toe angle of said second independently steerable wheel to create a second steering command.

20. The method of claim 15, wherein said zero position is a halfway point in a range of toe angles of said first linear steering actuator, and wherein said first toe angle is determined by a distance of extension or retraction of said first linear steering actuator from said predetermined reference point, and wherein said second toe angle is determined relative to a second predetermined reference point corresponding to a zero position of a second linear steering actuator associated with said second independently steerable wheel.

* * * * *